United States Patent
Kearney et al.

(10) Patent No.: US 12,242,481 B1
(45) Date of Patent: Mar. 4, 2025

(54) HARDWARE OPTIMIZED STRING TABLE FOR ACCELERATED RELATIONAL DATABASE QUERIES

(71) Applicant: Oracle International Corporation, Redwood Shores, CA (US)

(72) Inventors: James Kearney, Bolton, MA (US); Weiwei Gong, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/423,196

(22) Filed: Jan. 25, 2024

(51) Int. Cl.
  *G06F 16/00* (2019.01)
  *G06F 9/38* (2018.01)
  *G06F 16/2453* (2019.01)
  *G06F 16/2455* (2019.01)
  *G06F 16/27* (2019.01)

(52) U.S. Cl.
  CPC ........ *G06F 16/2455* (2019.01); *G06F 9/3887* (2013.01); *G06F 16/24542* (2019.01); *G06F 16/27* (2019.01)

(58) Field of Classification Search
  CPC ................. G06F 16/2455; G06F 16/27; G06F 16/24542; G06F 9/3887
  See application file for complete search history.

(56) References Cited

U.S. PATENT DOCUMENTS

| | | | | |
|---|---|---|---|---|
| 7,962,718 | B2 * | 6/2011 | Moyer | G06F 9/30036 712/220 |
| 2011/0292830 | A1 * | 12/2011 | Yanggratoke | H04L 47/10 370/253 |
| 2015/0288691 | A1 | 10/2015 | Dickie | |
| 2017/0024435 | A1 | 1/2017 | Kociubes et al. | |
| 2017/0046156 | A1 * | 2/2017 | Mahurin | G06F 9/30003 |
| 2017/0192892 | A1 | 7/2017 | Pundir et al. | |

(Continued)

FOREIGN PATENT DOCUMENTS

WO  WO2015099562 A1  7/2015

OTHER PUBLICATIONS

Chavan, U.S. Appl. No. 16/923,352, filed Jul. 8, 2020, Notice of Allowance and Fees Due.

(Continued)

*Primary Examiner* — Syed H Hasan
(74) *Attorney, Agent, or Firm* — Hickman Becker Bingham Ledesma LLP

(57) ABSTRACT

Data structures and methods are described to enable a hardware optimized dynamic string table for accelerating relational database queries. A method comprises retrieving a lookup key for a query against a dynamic string table, the lookup key associated with a key length and a key hash. The method further comprises configuring a formatted lookup key as in-line or out-of-line based on whether the key length exceeds a maximum inline key size. The method further comprises replicating, into a first plurality of single instruction, multiple data (SIMD) lanes, the formatted lookup key. The method further comprises writing a candidate bucket, selected from the dynamic string table based on the key hash, into a second plurality of SIMD lanes. The method further comprises performing a SIMD compare of the first plurality of SIMD lanes and the second plurality of SIMD lanes, and returning an associated code when the lookup key is matched.

20 Claims, 11 Drawing Sheets

(56) References Cited

U.S. PATENT DOCUMENTS

| | | | |
|---|---|---|---|
| 2018/0011893 A1 | 1/2018 | Kimura | |
| 2018/0081939 A1 | 3/2018 | Hopeman et al. | |
| 2021/0073233 A1 | 3/2021 | Chavan et al. | |

OTHER PUBLICATIONS

Wang, Wendy, et al., "Investigating Memory Optimization of Hash-Index for Next Generation Sequencing on Multi-Core Architecture", 2012 IEEE 26th IP&DPSW, pp. 665-674, downloaded May 13, 2021, 10 pgs.

Tirthankar Lahiri et al., "Oracle's In-Memory Database Strategy for OLTP and Analytics", ORACLE Corporation, Redwood Shores, 2015, 16pgs.

Tirthankar Lahiri et al., "Oracle Database In-Memory: A Dual format In-Memory Database", 2015 IEEE 31st Intl Conf on Data Engineering, IEEE, 2015, 6pgs.

Prokopec et al., "Lock-FreeResizable Concurrent Tries", https://citeseerx.ist.psu.edu/viewdoc/download?doi=10.1.1.454.9595&rep=rep1&typ e=pdf, dated 2011, 15 pgs.

Prokopec et al., "Concurrent Tries with Efficient Non-Blocking Snapshots", New Orleans, LA, https://www.researchgate.net/publication/221643801, dated Feb. 25-29, 2012, 11 pgs.

Prokopec et al. "Cache-Aware Lock-Free Concurrent Hash Tries", École Polytechnique Fédérale de Lausanne, https://arxiv.org/pdf/1709.06056.pdf, dated Jun. 14, 2011, 14 pgs.

Jonathan Lewis, "In-Memory Aggregation I Oracle Scratchpad", https://jonathanlewis.wordpress.com/2014/08/24/ in-memory-aggregation/, Aug. 24, 2014, 7pgs.

Bagwell, Phil, "Ideal Hash Trees", https://hashingit.com/elements/research-resources/2001-ideal-hash-trees.pdf, dated 2001, 19 pgs.

\* cited by examiner

FIG. 3

BUCKET ENTRY 300A

FORMAT 310A
2 bit field
"0b00": Empty

BUCKET ENTRY 300B

| FORMAT 310B<br>2 bit field<br>"0b01": In-line String | CODE 320B<br>32 bit Code<br>"0x318CABCD" | LENGTH 330B<br>3 bit Length<br>"0b110" | STRING 340B<br>7 byte string<br>"Boston" =<br>"0x42 6F 73 74 6F 6E 00" |
|---|---|---|---|

BUCKET ENTRY 300C

| FORMAT 310C<br>1 bit field<br>"0b1": Out-of-line String | HASH 325C<br>15 bit Hash Segment<br>"0x7AFE" | POINTER 350C<br>64 bit pointer<br>"0xDDDDAEAE12345678" |
|---|---|---|

STRUCT 360

| CODE 320C<br>32 bit Code<br>"0x319F1255" | STRING 340C<br>"Philadelphia" + null<br>"0x50 68 69 6C 61 64 65 6C 70 68 69 61 00" |
|---|---|

HARDWARE OPTIMIZED STRING TABLE FOR ACCELERATED RELATIONAL DATABASE QUERIES

RELATED CASES

This application is related to U.S. patent application Ser. No. 16/923,352 titled "Cache conscious techniques for generation of quasi-dense grouping codes of compressed columnar data in relational database systems" filed on Jul. 8, 2020 by Shasank Kisan Chavan et al., which is incorporated herein by reference.

FIELD OF THE INVENTION

The present disclosure relates to techniques for string matching. More specifically, the disclosure relates to providing a data structure and associated methods to enable a hardware optimized dynamic string table, with particular application for accelerating relational database queries.

BACKGROUND

String matching is a common operation that is required of many data processing tasks, including database queries. A dynamic string table is one type of data structure that can accelerate string matching, which functions by maintaining a list of strings presented to it. Thus, queries against the dynamic string table will return an associated code if the search key exists, and new string entries will automatically be inserted for search keys that do not exist.

Dynamic string tables can be implemented via hash tables by using the strings as the keys. Implementations may organize hash table entries into bucket groups. For unique or one-to-one mappings of keys to associated values, such as a dense grouping key, the associated value can be used as a compact proxy for the string, which is otherwise nominally unbounded in size. This can be leveraged to reduce memory and processing overhead for many relational database operations.

To optimize for the multi-core, multi-threaded processing capabilities of modern computing hardware, it is desirable to achieve high levels of parallelism when accessing and updating the dynamic string table. However, due to the data structures of existing hash table implementations, data may need to be processed serially, which precludes the efficient use of multiple concurrent threads and single instruction, multiple data (SIMD) instructions available in modern computing architectures. While adding levels of indirection can mitigate some parallelism issues, this also fragments memory access, leading to reduced performance. Further, it is preferable to minimize memory footprint, particularly for in-memory database implementations. Thus, an improved approach to enable a hardware optimized dynamic string table is needed.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 3 depicts example logical bucket entry formats for a hardware optimized string table.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Data structures and methods are described for supporting a hardware optimized dynamic string table. The dynamic string table may be organized as a hierarchy of buckets. Buckets in the dynamic string table are structured such that entries can include short in-line strings (inside the bucket) or longer out-of-line strings (a pointer to a string outside the bucket). The entries are formatted into multiple physical arrays such that either string type in an entire bucket can be compared in parallel against a replicated formatted search key using a SIMD compare instruction. Thus, the benefits of in-line strings, such as avoiding additional memory accesses, and the benefits of out-of-line strings, such as cache friendly fixed size data structures and facilitated parallel comparison, can both be achieved. Further, by including a hash value portion of the out-of-line string in the bucket entry, a large number of false positives can be filtered out to minimize expensive dereferencing of out-of-line string pointers.

The physical data structure of the buckets is configured to minimize memory footprint. For example, a constraint may be enforced that a code portion is shared by all in-line entries in a bucket, allowing that code portion to be stored only once in the bucket. Further, each bucket is allocated to a fixed size, which greatly simplifies memory management. The fixed size can also be set to a small multiple (e.g. 1, 2, 3) of the CPU cache line size, with the bucket storage kept aligned with cache lines for best performance.

Additional features are provided to facilitate highly parallel processing of the dynamic string table. Computational threads can consume a search key queue to enable parallel searching and insertion of multiple keys concurrently. Parallel reads of the buckets are performed in a non-blocking fashion. In each thread, SIMD instructions can be utilized to compare an entire bucket at once to a search key. SIMD compares can also be aggregated for multiple vector registers to increase bandwidth. For updating, each bucket includes a synchronization primitive that is used to ensure atomic updates. Buckets may also be pre-allocated according to an average growth rate to avoid potential performance and synchronization issues due to last minute allocation.

Example Database Management System

Figure 1:
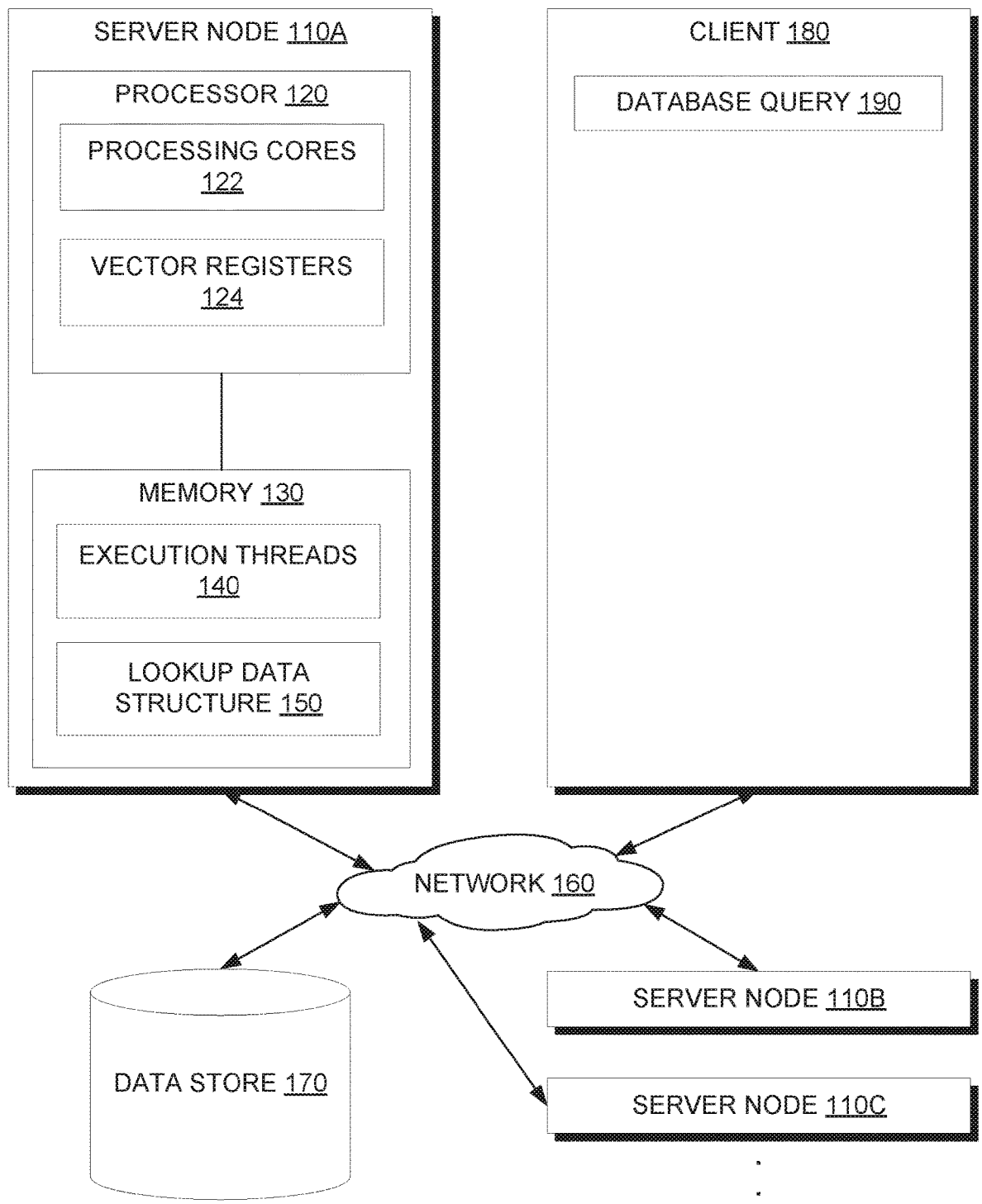
FIG. 1 is a block diagram that depicts an example database management system (DBMS) in which a hardware optimized string table may be supported.

FIG. 1 is a block diagram that depicts an example database management system (DBMS) 100 in which a hardware optimized dynamic string table may be supported. DBMS 100 includes server node 110A, server node 110B, server node 110C, network 160, data store 170, and client 180. Server node 110A includes processor 120 and memory 130. Processor 120 includes processing cores 122 and vector registers 124. Memory 130 includes execution threads 140 and lookup data structure 150. Client 180 includes database query 190.

Nodes 110A-110C maintain access to and manage data in a database, such as on data store 170. Each of nodes 110A-110C may be one or more of a rack server such as a blade, a personal computer, a mainframe, a virtual computer, or other computing device. Additional nodes may also be present that are not specifically shown. Further, nodes 110B and 110C may contain similar elements as node 110A, but the elements are omitted for illustrative purposes.

According to one or more embodiments, access to a given database comprises access to (a) a set of disk drives storing data for the database, and (b) data blocks stored thereon. The database may reside in any type of data store 170, including volatile and non-volatile storage, e.g., random access memory (RAM), one or more hard disks, main memory, etc.

Client 180 may be implemented by any type of computing device that is communicatively connected to network 160. In DBMS 100, client 180 is configured with a database client, which may be implemented in any number of ways, including as a stand-alone application running on client 180, or as a plugin to a browser running at client 180, etc. Client 180 may submit one or more database queries, including database query 190, to be serviced by one or more server nodes 110A-110C. Client 180 may be configured with other mechanisms, processes and functionalities, depending upon a particular implementation.

Figure 5:
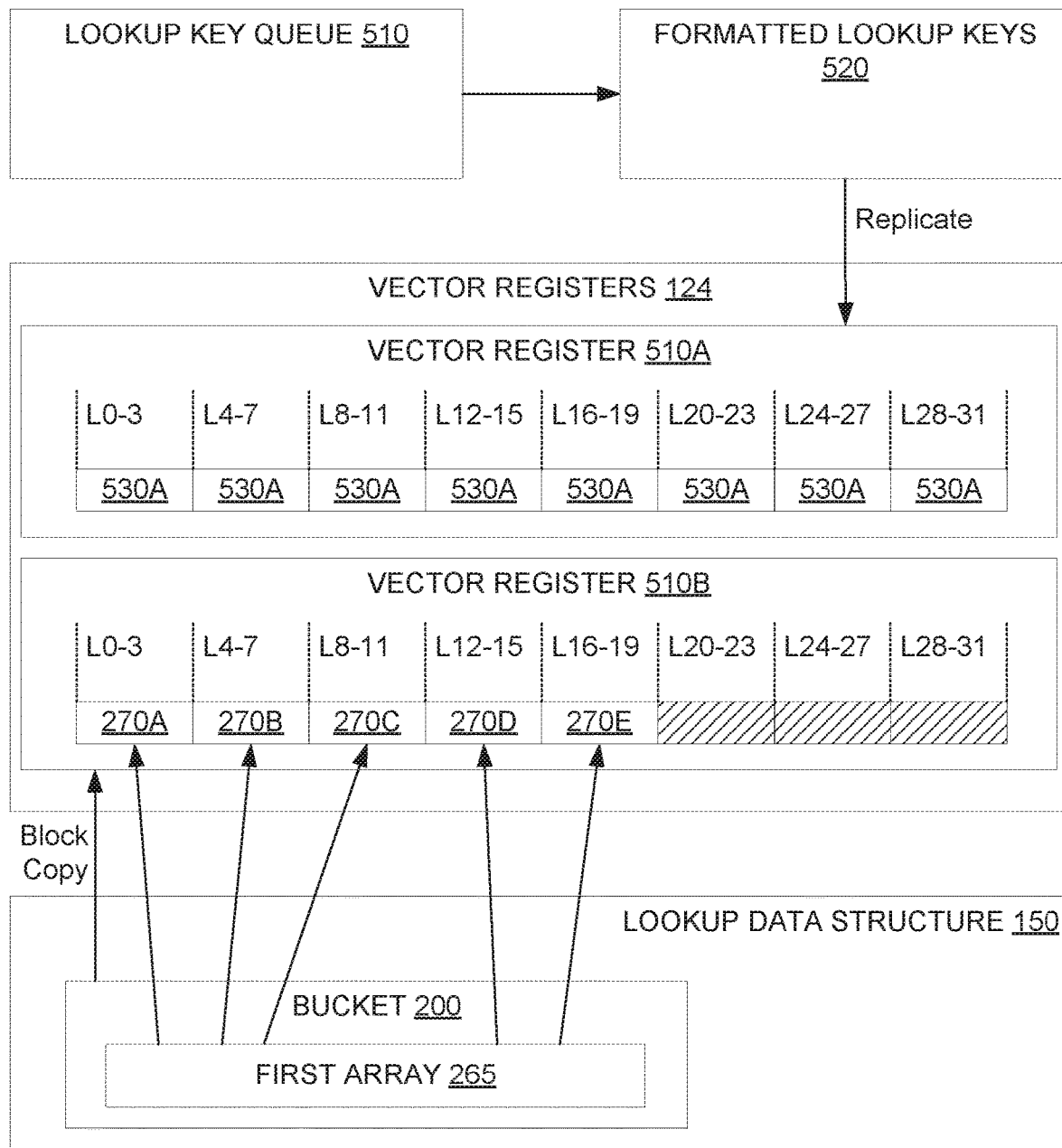
FIG. 5 is a block diagram that depicts formatting example vector registers for SIMD comparison instructions.

During the process of executing database query 190, which may include, for example, a table join, an aggregation, or a filter, server node 110A may require querying and updating of lookup data structure 150, which may be a dynamic string table that associates strings to values such as dense grouping keys. Lookup data structure 150 may correspond to a hierarchical multi-level hash table as shown in FIG. 5 and related description of U.S. patent application Ser. No. 16/923,352. Accordingly, lookup data structure 150 may include a hierarchy of buckets for organizing hash table entries. In some implementations, the hierarchy may be modified such that after a threshold depth, such as depth>3, linked lists or other data structures are used instead of hierarchical buckets.

Execution threads 140 may, in parallel, execute on processing cores 122 to perform queries and updates into lookup data structure 150. For optimal utilization of processing cores 122 and vector registers 124, it is desirable to provide a data structure for lookup data structure 150 that is amenable to parallel data processing on processor 120. Further, to improve performance and reduce overhead, it is desirable to minimize the memory footprint of lookup data structure 150 and to optimize memory access patterns within memory 130. Accordingly, a hardware optimized dynamic string table is proposed for lookup data structure 150, which is further described below.

Example Logical Bucket Structure

Figure 2A:
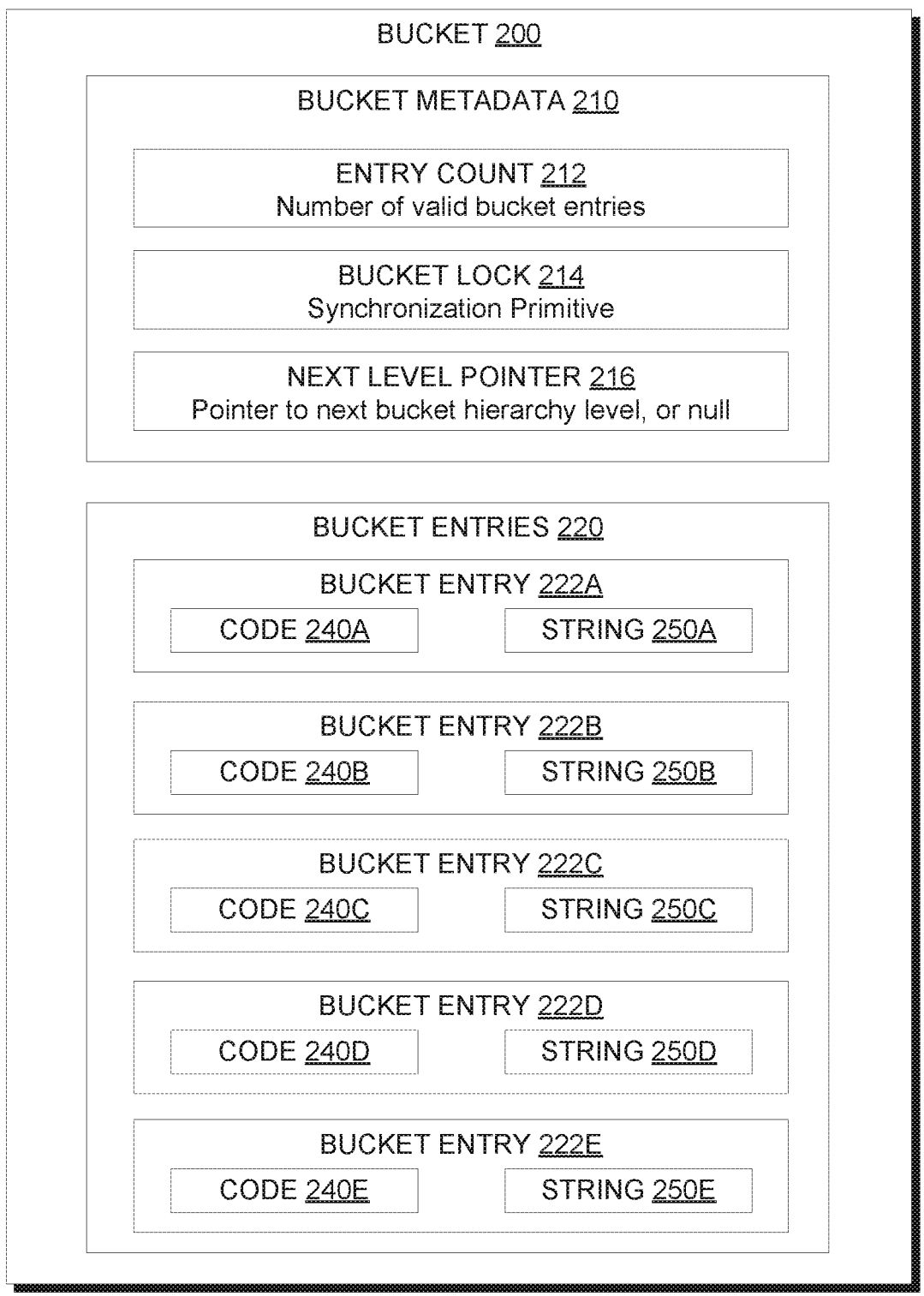
FIG. 2A depicts an example logical data structure of a bucket for a hardware optimized string table.

FIG. 2A depicts an example logical data structure of bucket 200 for a hardware optimized string table. Bucket 200 may correspond to a representative bucket within a bucket hierarchy of lookup data structure 150 of FIG. 1. Bucket 200 includes bucket metadata 210 and bucket entries 220. Bucket metadata 210 includes entry count 212, bucket lock 214, and next level pointer 216. Bucket entries 220 includes bucket entry 222A, bucket entry 222B, bucket entry 222C, bucket entry 222D, and bucket entry 222E. Bucket entry 222A includes code 240A and string 250A. Bucket entry 222B includes code 240B and string 250B. Bucket entry 222C includes code 240C and string 250C. Bucket entry 222D includes code 240D and string 250D. Bucket entry 222E includes code 240E and string 250E.

Referring to bucket metadata 210, entry count 212 may define the number of valid bucket entries within bucket entries 220. Bucket lock 214 may correspond to a synchronization primitive, such as a semaphore, mutex, or spinlock. Bucket lock 214 may be utilized to obtain an exclusive lock on bucket 200 in order to perform atomic updates to bucket 200. For example, a first thread obtains bucket lock 214 on bucket 200 in order to add a new entry into bucket 200. If bucket 200 is already locked by another thread, the first thread waits until it is available and then obtains bucket lock 214. Once bucket lock 214 is obtained, the first thread checks to see if another thread had added its new value in the meantime, which may possibly be in a newly created child bucket, and return the assigned code if it has. Otherwise, the first thread can proceed to add a new entry with a newly assigned code. Next level pointer 216 may point to the next hierarchy level in the bucket hierarchy of lookup data structure 150, or be a null pointer if bucket 200 does not have any children. In some implementations, bucket metadata 210 may also include other metadata not shown.

As shown in bucket entries 220, each bucket entry 222A-222E includes a string 250A-250E that maps to a respective value, or code 240A-240E. The codes 240A-240E may, for example, correspond to dense grouping keys for the respective string. Dense grouping keys may be assigned using incremental counters as new strings are introduced into the dynamic string table, as described in, e.g., FIG. 3 and related description of U.S. patent application Ser. No. 16/923,352.

Example Physical Bucket Structure

Figure 2B:
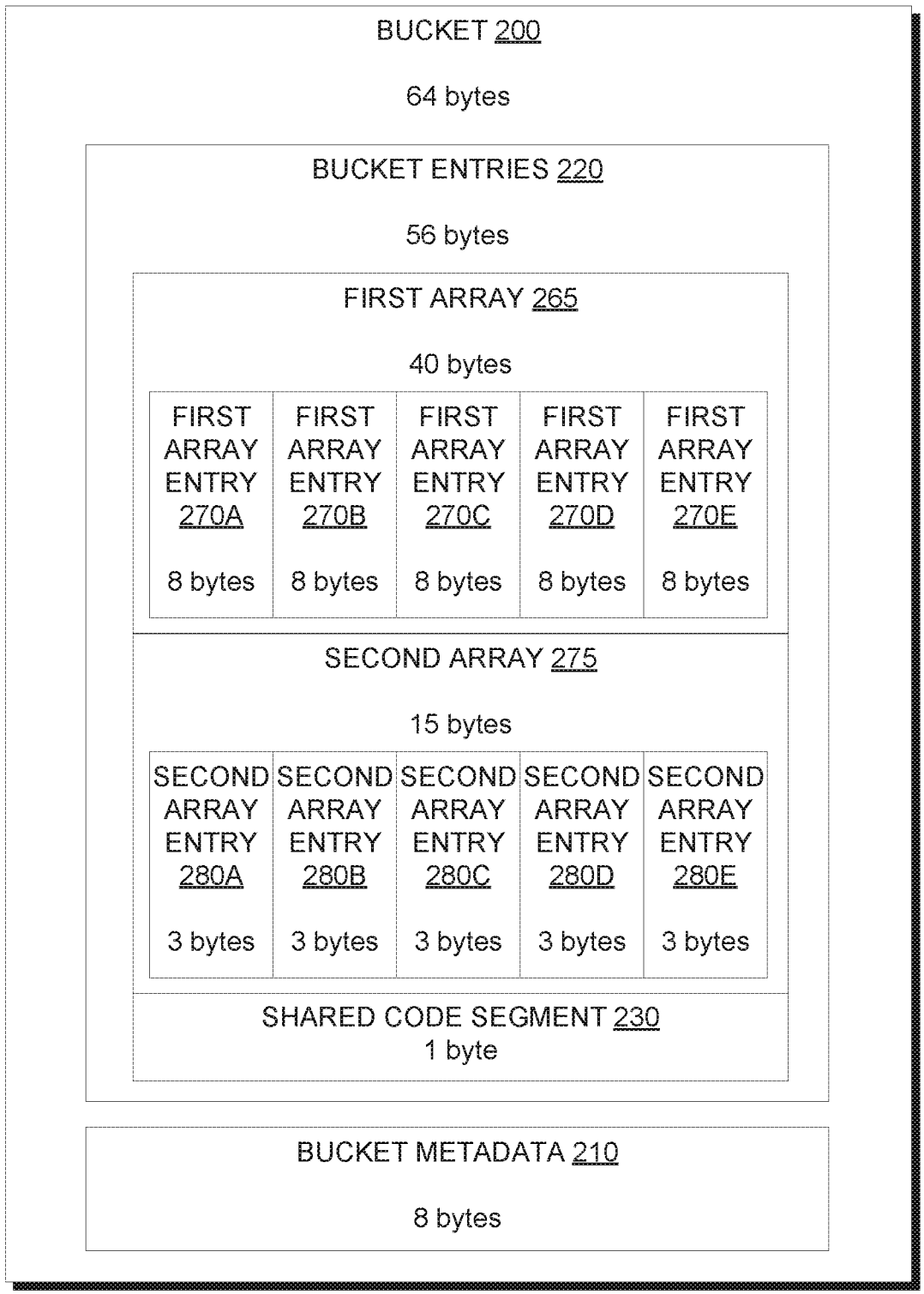
FIG. 2B depicts an example physical data structure of a bucket for a hardware optimized string table.

FIG. 2B depicts an example physical data structure of bucket 200 for a hardware optimized string table. Bucket 200 includes bucket metadata 210 and bucket entries 220. Bucket entries 220 includes first array 265, second array 275, and shared code segment 230. First array 265 includes first array entry 270A, first array entry 270B, first array entry 270C, first array entry 270D, and first array entry 270E. Second array 275 includes second array entry 280A, second array entry 280B, second array entry 280C, second array entry 280D, and second array entry 280E. With respect to FIG. 2B, bucket 200 may correspond to bucket 200 of FIG. 2A.

Example data sizes are shown in FIG. 2B, including bucket 200 (64 bytes), bucket metadata 210 (8 bytes), bucket entries 220 (56 bytes), shared code segment 230 (1 byte), first array 265 (40 bytes), first array entry 270A-270E (8 bytes each), second array 275 (15 bytes), and second array entry 280A-280E (3 bytes each). Bucket 200 may be allocated to a fixed size, which may be set to a cache line size of processor 120 of FIG. 1. This may facilitate keeping the most frequently accessed buckets within higher cache levels, thereby improving performance.

As shown in FIG. 2B, bucket entries 220 may be arranged as multiple physical arrays, or first array 265 and second array 275. This allows the data in bucket entries 220 to be rearranged such that first array 265 can be loaded as aligned and contiguous data into a plurality of SIMD lanes in a single operation, which can then be used in a SIMD compare operation. Further, after first array 265 is examined, processing of second array 275 can be omitted unless a potential key match is found in first array 265. The specific arrangement of data within first array 265 and second array 275 is described in further detail below with respect to FIG. 4A-4C.

By observing that the higher bits of the code values are generally less likely to change since dense grouping keys are assigned sequentially, a constraint may be enforced such that a portion of the most significant code bits, or shared code segment 230, is shared with all of the in-line bucket entries 220. This allows shared code segment 230 to be stored only once for the entire bucket 200, thereby saving memory. In practice, since join keys and aggregations are over quantities that are typically naturally bounded such as dates, products, customers, etc., this constraint does not pose a significant limitation. Even large data sets rarely have a cardinality that exceeds a million. Assuming a 32-bit code with an 8-bit shared segment as with shared code segment 230, this still leaves a 24-bit address, which can accommodate approximately 16 million values. Nevertheless, the size of shared code segment 230 can be adjusted according to the expected database workload.

Example Logical Bucket Entry Formats

FIG. 3 depicts example logical bucket entry formats for a hardware optimized string table. Bucket entry 300A includes format 310A. Bucket entry 300B includes format 310B, code 320B, length 330B, and string 340B. Bucket entry 300C includes format 310C, hash 325C, and pointer 350C. Struct 360 includes code 320C and string 340C. Bucket entries 300A-300C may each correspond to any of bucket entries 222A-222E in FIG. 2A.

Logical Empty Bucket Entry

Bucket entry 300A corresponds to an empty bucket entry. Initially, all entries in a bucket may be empty. As shown in format 310A, an empty bucket entry is indicated by setting two bits as "zero-zero" in fixed bit positions.

Logical In-Line String Bucket Entry

Bucket entry 300B corresponds to an in-line string bucket entry. As shown in format 310A, an in-line string bucket entry is indicated by setting two bits as "zero-one" in fixed bit positions. For example, when a string is determined to not exceed a maximum in-line string length, or in this example 7 bytes, then the string can be stored in-line, or within the bucket itself. As shown in FIG. 3, string 340B having a length 330B of 6 bytes corresponds to "Boston", which is mapped to code 320B, or the 32-bit value 0x318CABCD. Since the string "Boston" does not fill the entire 7 bytes available in string 340B, the empty bytes may be filled with a predetermined value, such as null or zero.

Logical Out-of-Line String Bucket Entry

Bucket entry 300C corresponds to an out-of-line string bucket entry. As shown in format 310A, an out-of-line string bucket entry is indicated by setting one bit as "one" in a fixed bit position. Note that since format 310C only uses 1 bit, an additional data bit is now available for the rest of bucket entry 300C. Since there are only three formats to distinguish (empty, in-line, out-of-line), it is permissible to assign both "one-zero" and "one-one" format bits to out-of-line strings, and thus the second format bit can instead be assigned to a different logical data value, such as hash 325C.

When a string is determined to exceed the maximum in-line string length, or 7 bytes in this example, then the string can be stored out-of-line. In the case of bucket entry 300C, string 340C or "Philadelphia" exceeds 7 bytes and is therefore too large to fit within bucket entry 300C itself. Accordingly, a pointer 350C referencing struct 360 is provided instead, which can be dereferenced to obtain code 320C and string 340C. As shown in FIG. 3, string 340C may be defined using a null terminated string, but a string length may be used as an alternative. Struct 360 may be allocated separately from a bucket containing bucket entry 300C, such as within a reserved area of lookup data structure 150.

Hash 325C may correspond to the value of a hash function applied to string 340C that is further truncated to a 15-bit segment, for example by choosing the least significant bits. Note that the hash function is not necessarily the same function as the string to code mapping in lookup data structure 150. The length of hash 325C may be configured such that the combined length of format 310C and hash 325C fit within one or more SIMD lanes of vector registers 124. When comparing a search key to bucket entry 300C, the hash function can also be applied to the search key and the same 15-bit segment can be compared to hash 325C. If there is a match, then pointer 350C should be dereferenced to check whether string 340C actually matches the search key or not. Otherwise, there is no need to dereference pointer 350C. In this way, a large portion of false positives can be quickly filtered out to reduce processing overhead of out-of-line strings.

Example Physical Bucket Entry Formats

Figure 4A:
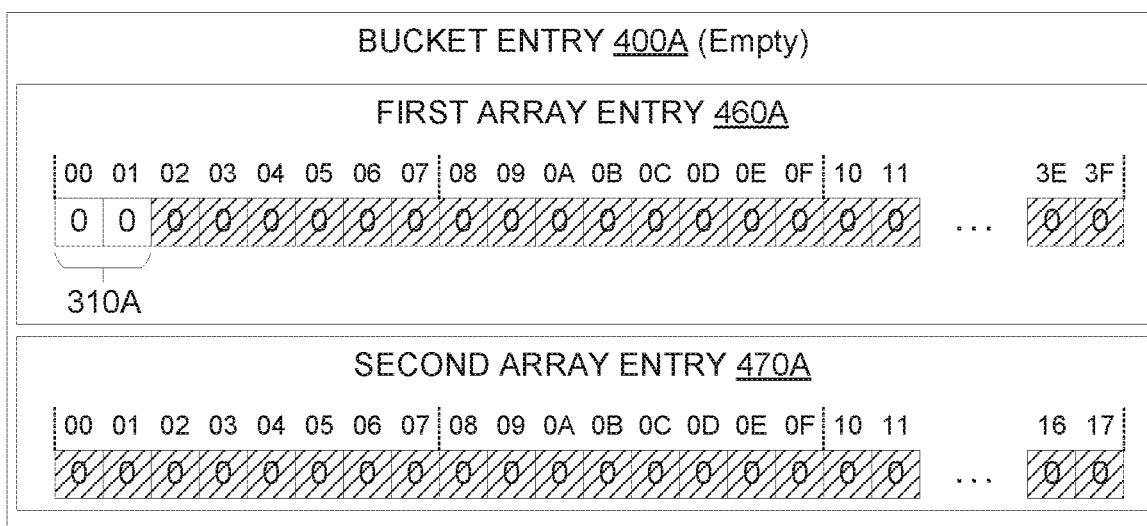
FIG. 4A, FIG. 4B, and FIG. 4C depict example physical bucket entries for a hardware optimized string table.
Figure 4B:
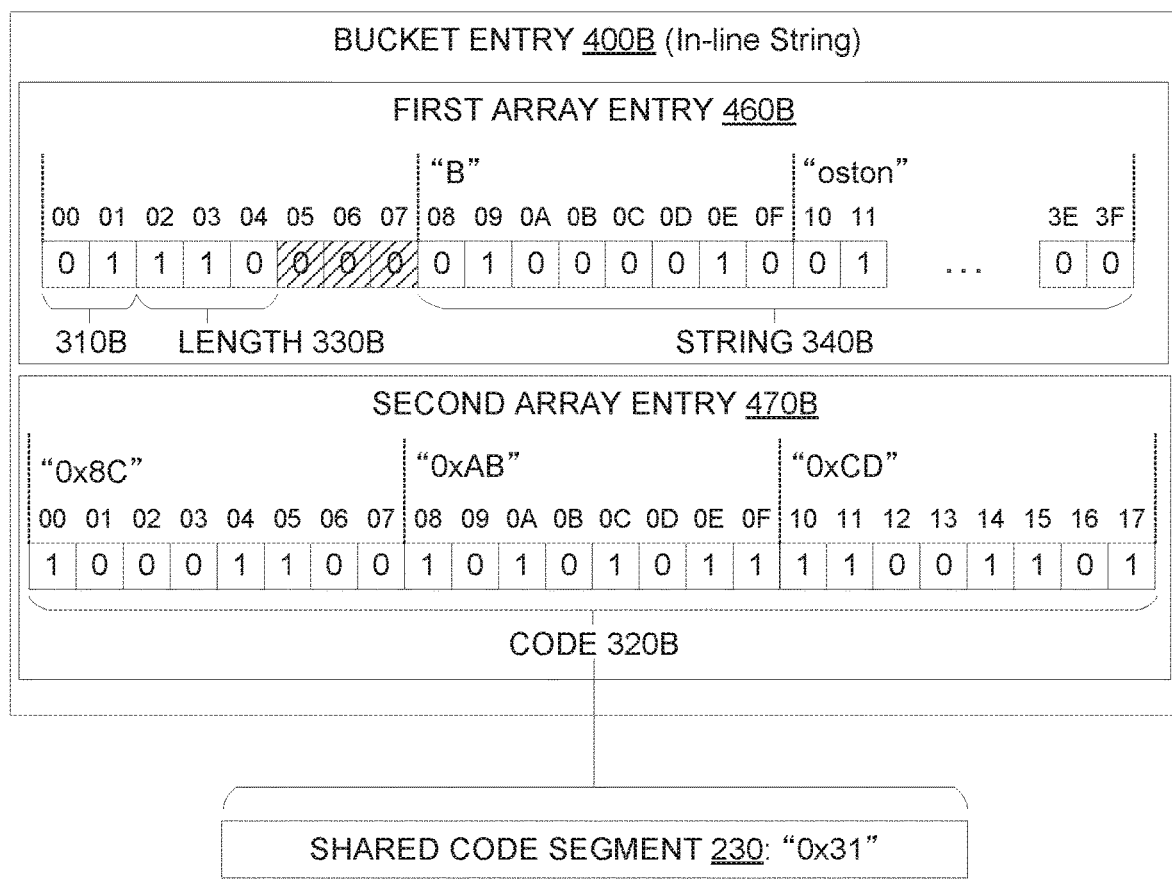
Figure 4C:
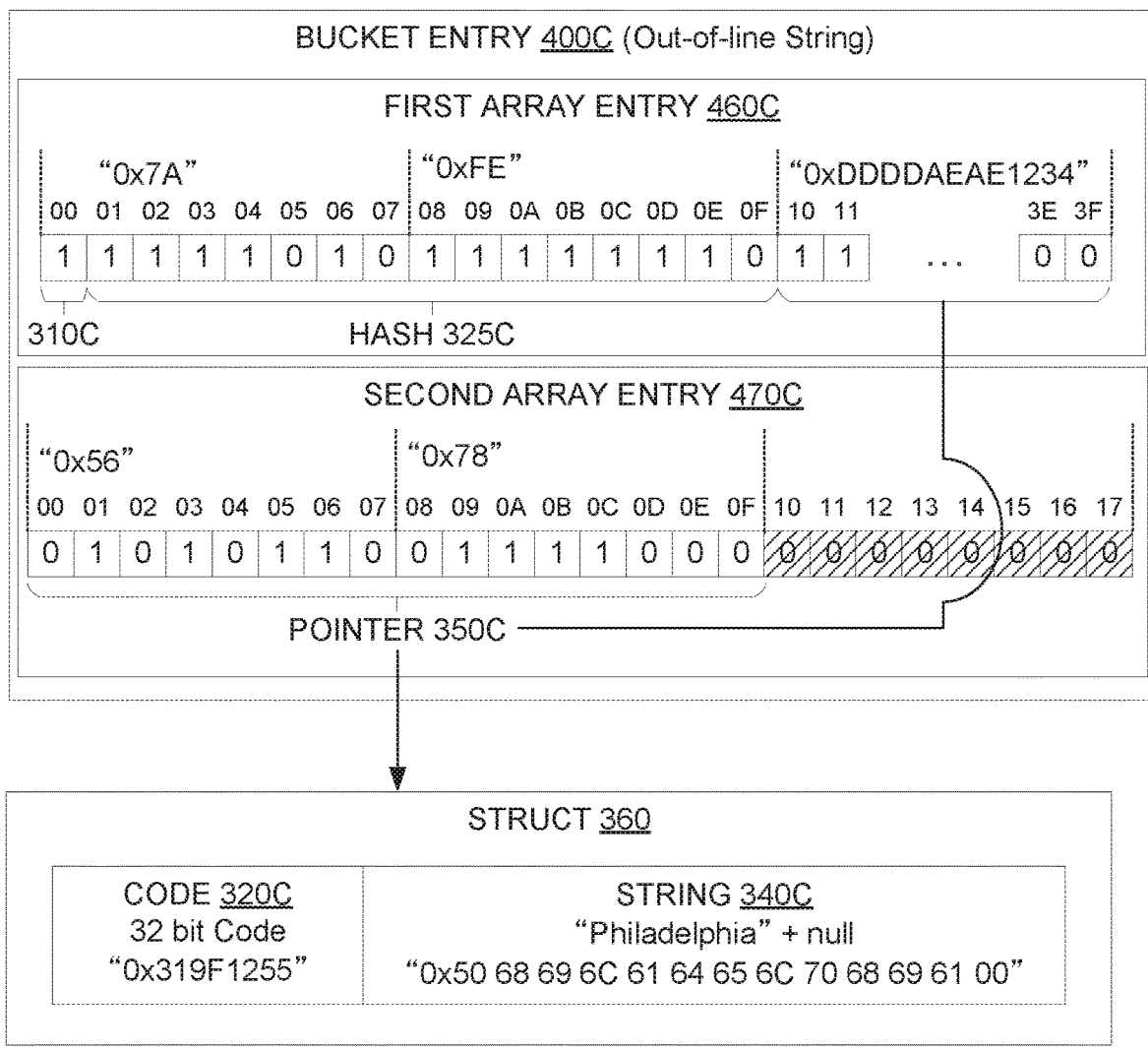

FIG. 4A, FIG. 4B, and FIG. 4C depict physical bucket entries 400A, 400B, and 400C for a hardware optimized string table. Bucket entries 400A-400C may correspond to respective bucket entries 300A-300C in FIG. 3.

Physical Empty Bucket Entry

Bucket entry 400A corresponds to an empty bucket entry. As shown in FIG. 4A, format 310A is assigned to a fixed position, or the first two bits of first array entry 460A. The remaining bits of first array entry 460A and second array entry 470A are unused bits, as indicated by the patterned shading. For SIMD comparison purposes, these unused bits may be set to a default value, such as 0.

Physical In-Line String Bucket Entry

Bucket entry 400B corresponds to an in-line string bucket entry. As shown in FIG. 4B, format 310B is assigned to the same fixed position as format 310A, or the first two bits of first array entry 460B. The next three bits are reserved for length 330B, which allows string 340B to be defined from 0 to 7 bytes in length. The number of bits reserved for length 330B can be adjusted based on the maximum in-line string length. The next three bits after length 330B are unused to provide byte alignment for string 340B. Finally, string 340B fills the remaining bits of first array entry 460B. As discussed above, for strings that are shorter than the maximum in-line string length, the unused ending bytes may be filled with a default value such as null or zero.

Next, in second array entry 470B, three of the least significant bytes of code 320B are stored, which can be combined with the most significant byte provided by shared code segment 230 to form the full 32-bit code of bucket entry 400B. As shown in FIG. 4B, most of the allocated space for bucket entry 400B is efficiently utilized, and shared code segment 230 only needs to be stored once for all in-line string entries of the entire bucket.

Physical Out-of-Line String Bucket Entry

Bucket entry 400C corresponds to an out-of-line string bucket entry. As shown in FIG. 4C, format 310C is assigned to a fixed position, or the first bit of first array entry 460C. The next 15 bits are reserved for hash 325C, or the hash portion used as a pre-filter to remove non-matching search candidates. The next six bytes store a first portion of pointer 350C. The remaining second portion of pointer 350C is stored in second array entry 470C. Since pointer 350C is 64 bits, the last 8 bits of second array entry 470C are unused. When pointer 350C is dereferenced, code 320C and string 340C are accessible.

Formatting Search Keys for SIMD Compare of Entire Bucket

FIG. 5 is a block diagram that depicts formatting vector registers 124 for SIMD comparison instructions. FIG. 5 includes vector registers 124, lookup data structure 150, lookup key queue 510, and formatted lookup keys 520. Vector registers 124 include vector register 510A and vector register 510B. Vector register 510A includes formatted key 530A. Vector register 510B includes first array entry 270A-270E. Lookup data structure 150 includes bucket 200. Bucket 200 includes first array 265. With respect to FIG. 5, vector registers 124 and lookup data structure 150 may correspond to like numbered elements from FIG. 1.

Lookup key queue 510 may contain a queue of strings for searching against lookup data structure 150. For example, in the context of a database query, a column of strings in a database table may need to be associated with proxy values such as dense grouping keys. Accordingly, lookup key queue 510 may correspond to the column of strings in the database table. In one example, the column may correspond to a string that indicates a city name, such as "Boston" or "Philadelphia". Thus, lookup key queue 510 may correspond to a list of city strings to be searched against lookup data structure 150. When lookup data structure 150 is a dynamic string table, lookup data structure 150 is also updated with the strings from lookup key queue 510.

The strings in lookup key queue 510 are formatted for searching against the buckets of lookup data structure 150. Specifically, the strings are formatted such that they can be replicated into SIMD lanes for a SIMD compare against an entire bucket, which may include both in-line and out-of-line strings. Thus, formatted lookup keys 520 may be limited to the same data element size of first array 265, or 8 bytes/64 bits.

A search key in lookup key queue 510 may be examined to see whether it exceeds the maximum in-line string length. If it does not, then the search key is formatted as in-line, similar to first array entry 460B in FIG. 4B.

Otherwise, if a search key in lookup key queue 510 exceeds the maximum in-line string length, the search key is formatted as out-of-line. Thus, a hash value is retrieved or calculated for the search key and truncated to 15 bits, and may be formatted similar to the first 16 bits of first array entry 460C in FIG. 4C, with the remaining 48 bits set to zero. Accordingly, only the first 16 bits are necessary for comparison. This can be accomplished by using a 16-bit wide SIMD lane and evaluating the $1^{st}$ SIMD lane compare result while ignoring the $2^{nd}$, $3^{rd}$, and $4^{th}$ SIMD lane compare results.

The formatted lookup keys 520 can then be replicated into vector registers 124. This can be a multi-threaded operation to process multiple search keys concurrently. Further, for improved bandwidth, SIMD compare operations may be aggregated and executed once a threshold number of vector registers are ready. However, for the example illustrated in FIG. 5, the SIMD compare may be assumed to be executed by a single thread for a single vector register.

For example, formatted key 530A may be retrieved from formatted lookup keys 520 and replicated across the SIMD lanes of vector register 510A, as shown. Since formatted key 530A is 64 bits, it occupies four 16-bit wide SIMD lanes. Vector registers 124 may correspond to 512-bit registers. Thus, formatted key 530A is replicated into SIMD lanes 0-3, 4-7, 8-11, 12-15, 16-19, 20-23, 24-27, and 28-31.

Lookup data structure 150 may be traversed using the hash of the search or lookup key, as described in U.S. patent application Ser. No. 16/923,352. As each candidate bucket in the bucket hierarchy is examined, the bucket can be block copied to a corresponding vector register. Due to bucket 200 using multiple physical arrays, first array 265 can be mapped into vector register 510B such that first array entries 270A-270E map into respective SIMD lanes 0-3, 4-7, 8-11, 12-15, and 16-19. Other bucket data such as second array 275 are also copied into the remaining SIMD lanes, but can be ignored for the purposes of the SIMD compare, as indicated by the shaded lanes.

Now that vector registers 510A and 510B are prepared, a SIMD comparison may proceed. For in-line entries, all four SIMD lanes must match. For out-of-line entries, only the first SIMD lane must match-if it does, then second array 275 can be further examined to dereference the associated pointer and compare the out-of-line string against the search key. If there is a match, then the traversal can end and the associated code can be returned. Otherwise, the traversal continues until a bucket without a child is reached. At that point, if there are still no matches, then the search key can be inserted with a newly generated code, or a new bucket can be added. Bucket lock 214 may be utilized to ensure atomic updates. To avoid last minute allocation of new buckets, an average bucket growth rate may be monitored and new buckets may be preemptively allocated into lookup data structure 150 according to the growth rate.

Example Lookup and Insertion Process

Figure 6:
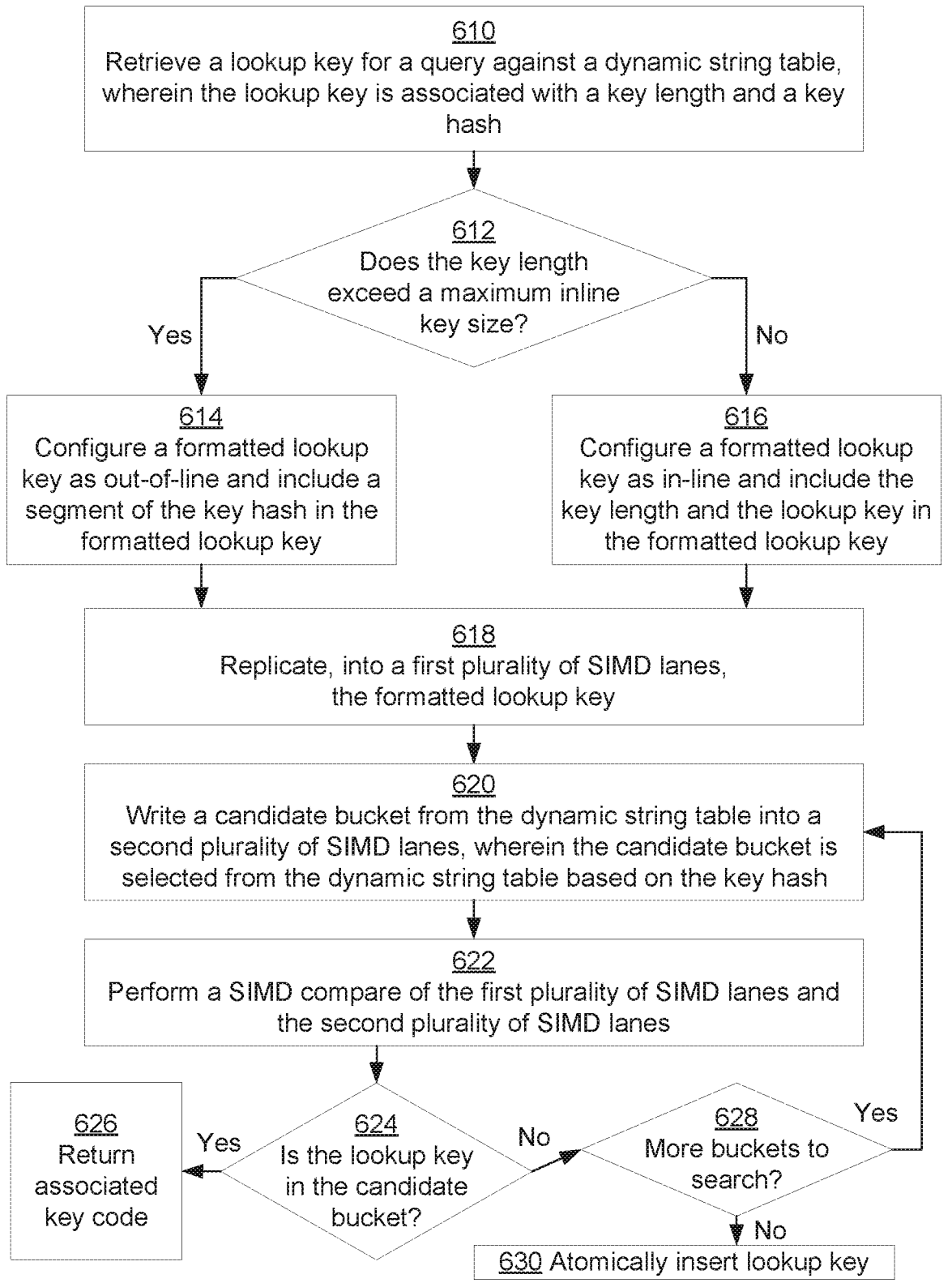
FIG. 6 is a flow diagram that depicts an example process that a thread may perform to lookup a requested string in a hardware optimized string table.

FIG. 6 is a flow diagram that depicts an example process 600 that execution threads 140 may concurrently perform to lookup requested strings in a hardware optimized string table.

Referring to FIG. 5, in block 610, a thread retrieves a lookup key from lookup key queue 510 for a query against lookup data structure 150, wherein the lookup key is associated with a key length and a key hash. In some implementations, the key length and/or key hash may be pre-calculated and retrieved from storage, and in other implementations, the key length and/or key hash may be calculated as needed.

In block 612, the thread examines the key length to determine whether it exceeds the maximum inline key size. In the examples described above, the maximum inline key size is 7 bytes. However, this will vary depending on the exact bucket structure and bucket size utilized. If the key length exceeds the maximum inline key size, then process 600 proceeds to block 614. Otherwise, process 600 proceeds to block 616.

In block 614, the thread configures a formatted lookup key in formatted lookup keys 520 as out-of-line and includes a segment of the key hash in the formatted lookup key. As discussed above, the lookup key may be formatted similar to the first 16 bits of first array entry 460C in FIG. 4C, with the remaining 48 bits set to zero. Process 600 proceeds to block 618.

In block 616, the thread configures a formatted lookup key in formatted lookup keys 520 as in-line and includes the key length and the lookup key, similar to first array entry 460B in FIG. 4B. Process 600 proceeds to block 618.

In block 618, the thread replicates formatted key 530A into the SIMD lanes of vector register 510A. Since formatted key 530A is 64 bits and vector register 510A is 512 bits, formatted key 530A is replicated 8 times into the groups of 4×16-bit wide SIMD lanes, as shown.

In block 620, the thread writes bucket 200 from lookup data structure 150 into SIMD lanes of vector register 510B, wherein bucket 200 is selected from lookup data structure 150 based on a traversal using the key hash. As shown in FIG. 5, the entire bucket 200 may be block copied at a single time.

In block 622, the thread performs a SIMD compare of vector registers 510A and 510B.

In block 624, the thread checks whether the lookup key was found in bucket 200 based on the SIMD compare. As discussed above, if there is an in-line string match, then the associated code can be returned right away in block 626, and process 600 ends. If there is an out-of-line string match, then the external string needs to be compared to the lookup key before proceeding to block 626. Otherwise, none of the entries in bucket 200 match the lookup key, and process 600 proceeds to block 628.

In block 628, the thread checks if there are any more buckets to search in lookup data structure 150. As discussed above, this is by traversing the bucket hierarchy using the key hash. If more buckets are available, then process 600 returns to block 602 to check a new candidate bucket. Otherwise, process 600 ends at block 630, wherein the lookup key is atomically inserted into lookup data structure 150.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
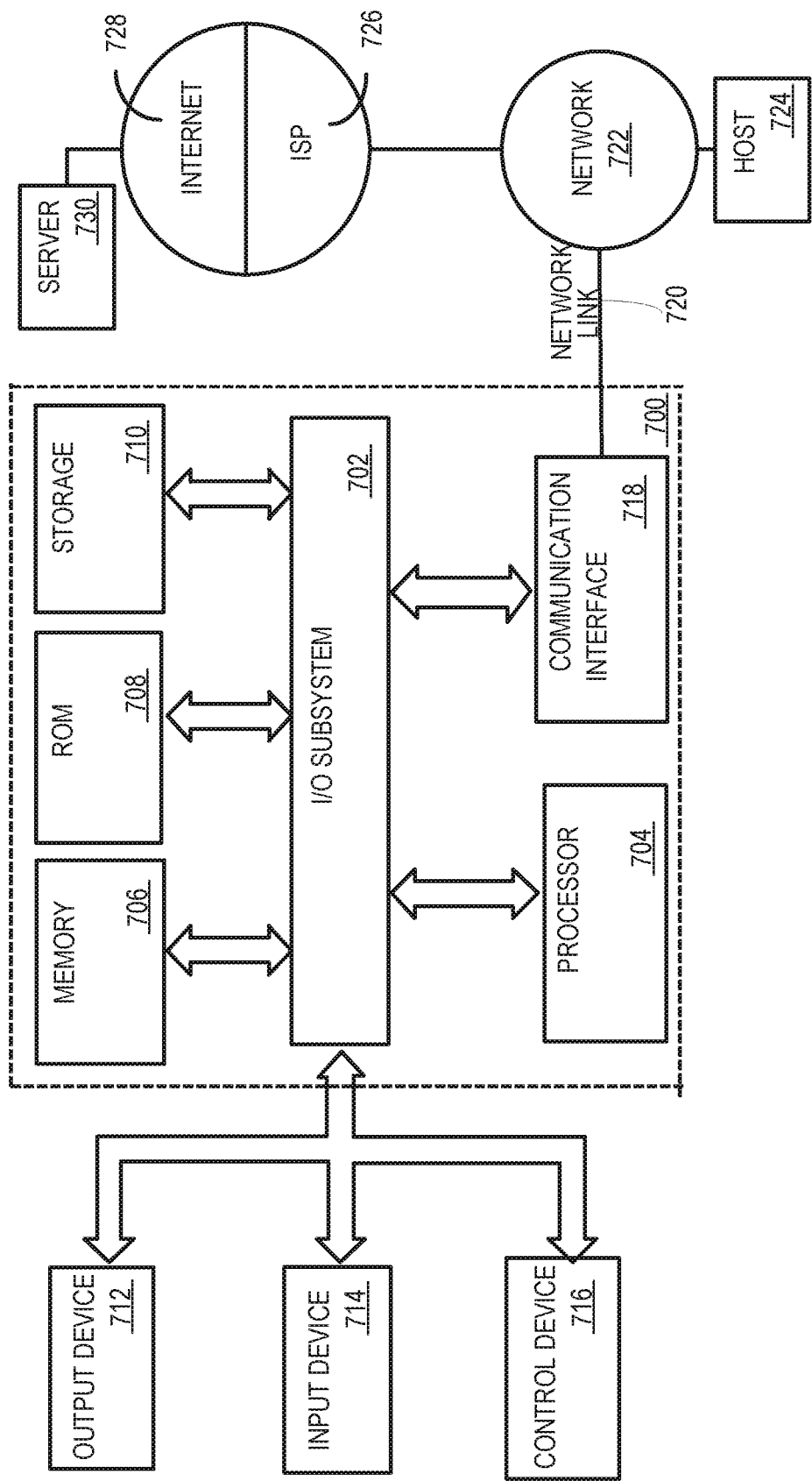
FIG. 7 illustrates a block diagram of a computing device in which the example embodiment(s) of the present invention may be embodiment.
Figure 8:
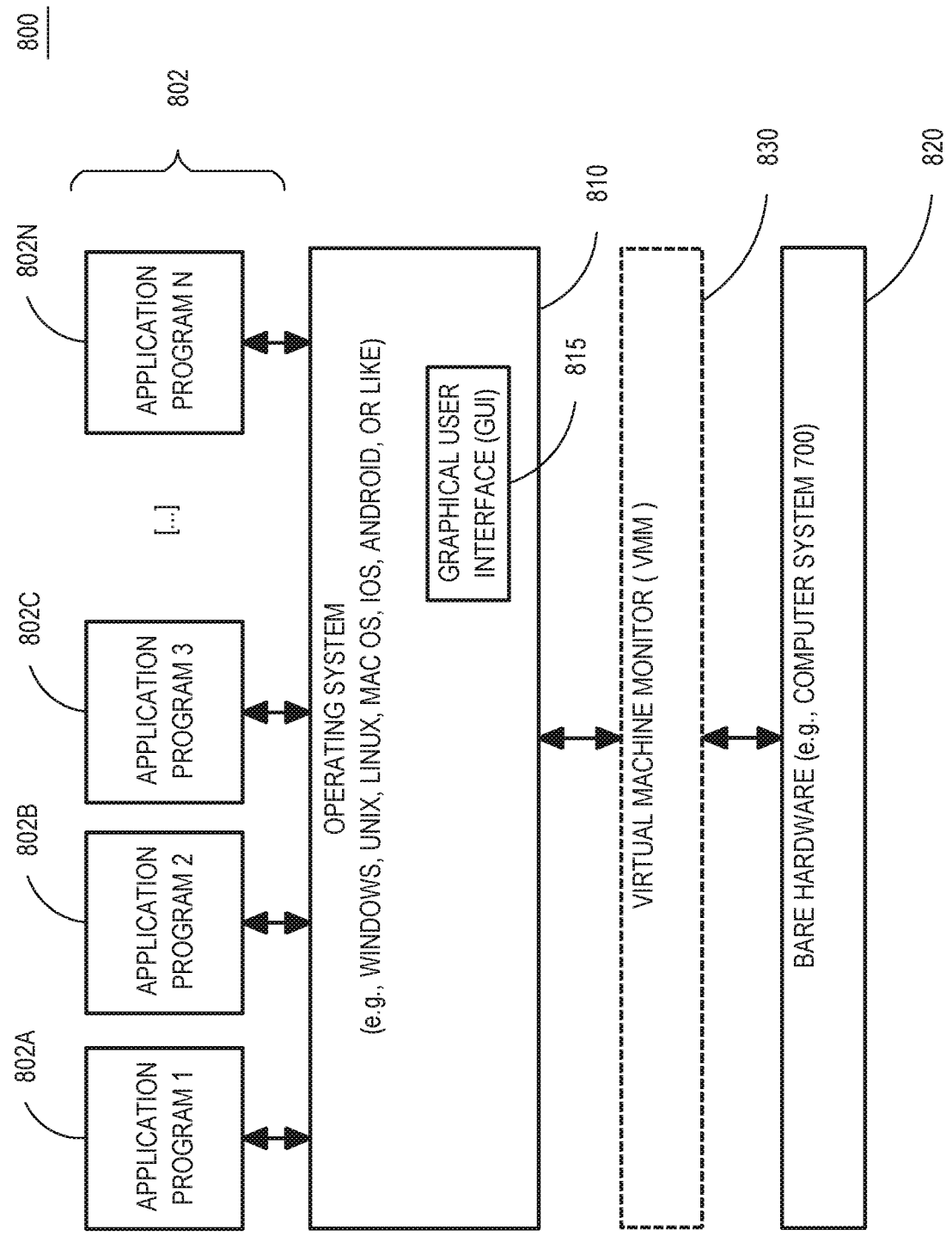
FIG. 8 illustrates a block diagram of a basic software system for controlling the operation of a computing device.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 1030 might transmit a requested code for an application program through Internet 728, ISP 726, local network 722 and communication interface 718.

The received code may be executed by processor 704 as it is received, and/or stored in storage device 710, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

FIG. 11 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising, concurrently for each thread of a plurality of computational threads:
   retrieving a lookup key for a query against a dynamic string table, wherein the lookup key is associated with a key length and a key hash;
   in response to determining that the key length exceeds a maximum inline key size, configuring a formatted lookup key as out-of-line and including a segment of the key hash in the formatted lookup key;
   in response to determining that the key length does not exceed the maximum inline key size, configuring the formatted lookup key as in-line and including the key length and the lookup key in the formatted lookup key;
   replicating, into a first plurality of single instruction, multiple data (SIMD) lanes, the formatted lookup key;
   writing a candidate bucket from the dynamic string table into a second plurality of SIMD lanes, wherein the candidate bucket is selected from the dynamic string table based on the key hash;
   performing a SIMD compare of the first plurality of SIMD lanes and the second plurality of SIMD lanes; and
   in response to determining, based on the SIMD compare, that the lookup key is present in the candidate bucket, returning an associated code as a result of the query.

2. The method of claim 1, further comprising:
   in response to determining, based on the SIMD compare, that the lookup key is not present in the candidate bucket, and determining that no additional candidate buckets exist in the dynamic string table, atomically inserting the lookup key with a generated code into the dynamic string table.

3. The method of claim 1, wherein the generated code is a dense grouping key (DGK).

4. The method of claim 1, wherein writing the candidate bucket into the second plurality of SIMD lanes is by a single block operation.

5. The method of claim 1, wherein the candidate bucket is a fixed size configured to match a cache line size of a processor executing the plurality of computational threads.

6. The method of claim 1, wherein entries in the candidate bucket are arranged into a plurality of physical arrays for data alignment into the second plurality of SIMD lanes.

7. The method of claim 1, wherein the candidate bucket includes an in-line entry comprising an in-line string, a code of the in-line string, and a length of the in-line string.

8. The method of claim 7, wherein the code of the in-line string includes a shared code segment that is shared with the candidate bucket.

9. The method of claim 1, wherein the candidate bucket includes an out-of-line entry comprising a hash segment of an out-of-line string and a pointer to the out-of-line string and a code associated with the out-of-line string.

10. The method of claim 1, wherein configuring the formatted lookup key as out-of-line or in-line comprises setting fixed bit positions of the formatted lookup key.

11. One or more non-transitory computer-readable media storing instructions that, when executed by one or more processors, cause:
    retrieving a lookup key for a query against a dynamic string table, wherein the lookup key is associated with a key length and a key hash;
    in response to determining that the key length exceeds a maximum inline key size, configuring a formatted lookup key as out-of-line and including a segment of the key hash in the formatted lookup key;
    in response to determining that the key length does not exceed the maximum inline key size, configuring the formatted lookup key as in-line and including the key length and the lookup key in the formatted lookup key;
    replicating, into a first plurality of single instruction, multiple data (SIMD) lanes, the formatted lookup key;
    writing a candidate bucket from the dynamic string table into a second plurality of SIMD lanes, wherein the candidate bucket is selected from the dynamic string table based on the key hash;
    performing a SIMD compare of the first plurality of SIMD lanes and the second plurality of SIMD lanes; and
    in response to determining, based on the SIMD compare, that the lookup key is present in the candidate bucket, returning an associated code as a result of the query.

12. The one or more non-transitory computer-readable media of claim 11, wherein the instructions further cause:
    in response to determining, based on the SIMD compare, that the lookup key is not present in the candidate bucket, and determining that no additional candidate buckets exist in the dynamic string table, atomically inserting the lookup key with a generated code into the dynamic string table.

13. The one or more non-transitory computer-readable media of claim 11, wherein the generated code is a dense grouping key (DGK).

14. The one or more non-transitory computer-readable media of claim 11, wherein writing the candidate bucket into the second plurality of SIMD lanes is by a single block operation.

15. The one or more non-transitory computer-readable media of claim 11, wherein the candidate bucket is a fixed size configured to match a cache line size of the one or more processors executing the instructions.

16. The one or more non-transitory computer-readable media of claim 11, wherein entries in the candidate bucket are arranged into a plurality of physical arrays for data alignment into the second plurality of SIMD lanes.

17. The one or more non-transitory computer-readable media of claim 11, wherein the candidate bucket includes an in-line entry comprising an in-line string, a code of the in-line string, and a length of the in-line string.

18. The one or more non-transitory computer-readable media of claim 17, wherein the code of the in-line string includes a shared code segment that is shared with the candidate bucket.

19. The one or more non-transitory computer-readable media of claim 11, wherein the candidate bucket includes an out-of-line entry comprising a hash segment of an out-of-line string and a pointer to the out-of-line string and a code associated with the out-of-line string.

20. The one or more non-transitory computer-readable media of claim 11, wherein configuring the formatted lookup key as out-of-line or in-line comprises setting fixed bit positions of the formatted lookup key.

* * * * *